United States Patent [19]

Lassalle

[11] Patent Number: 5,745,293
[45] Date of Patent: Apr. 28, 1998

[54] LIGHT TRAP

[75] Inventor: Martine Lassalle, Voisins le Bretonneux, France

[73] Assignee: Aerospatiale Societe Nationale Industrielle, Paris, France

[21] Appl. No.: 697,558

[22] Filed: Aug. 28, 1996

[30] Foreign Application Priority Data

Aug. 28, 1995 [FR] France ................................ 95 10124

[51] Int. Cl.⁶ ................................................ E02B 27/00
[52] U.S. Cl. ........................ 359/614; 359/601; 359/613; 385/902
[58] Field of Search ........................... 359/601, 602, 359/609–614, 350, 361, 709–712, 896; 385/902; 250/352–353

[56] References Cited

U.S. PATENT DOCUMENTS

| | | | |
|---|---|---|---|
| 3,647,435 | 3/1972 | Land | 430/220 |
| 3,675,984 | 7/1972 | Vulmiere et al. | 385/902 |
| 4,179,187 | 12/1979 | Chand | 359/360 |
| 4,621,898 | 11/1986 | Cohen | 359/613 |
| 4,929,834 | 5/1990 | Liebson | 359/601 |
| 4,990,782 | 2/1991 | Wellman et al. | 359/601 |

FOREIGN PATENT DOCUMENTS 2088198  1/1972  France .
8004762  9/1981  France .

OTHER PUBLICATIONS

Patent Abstracts of Japan, vol. 013, No. 407, (E–818), Sep. 8, 1989.

Primary Examiner—Thong Nguyen
Attorney, Agent, or Firm—Fisher, Christen & Sabol

[57] ABSTRACT

A light trap for a parallel light beam includes an entry member having a frustoconical opening in it and a conical body attached to a back wall of the trap. The frustoconical opening narrows from the outside towards the inside and has at the outside a diameter equal to the diameter D of the light beam. The entry member has a thickness $E=D/(\tan 2A + \tan A)$ where A is the cone angle of the frustoconical opening. The conical body reflects light uniformly in all directions.

6 Claims, 1 Drawing Sheet

LIGHT TRAP

BACKGROUND OF THE INVENTION

1. Field of the Invention

The present invention concerns a light trap.

2. Description of the Prior Art

A light trap of this kind is usually employed in optical systems or optical instruments to eliminate unwanted light that may interfere with the operations to be carried out. The unwanted light to be eliminated is often in the form of a light beam generated during said operation and at least part of which is not used. For example, it may be the unused diffused part of a light beam projected onto a semi-reflecting mirror, the reflected part of which is required for the processing and other operations intended, or vice versa.

Unwanted light of this kind is a nuisance if it can disturb the processing operations carried, for example by generating spurious images in image processing devices or by modifying the luminous intensity in instruments for measuring luminous intensity.

Document FR-2 088 198 describes a light trap for eliminating an unwanted light beam and including an enclosure in the form of a body of revolution comprising:

a lateral wall with an absorbent internal surface;

an entry member disposed longitudinally at one end of said enclosure, having an internal face, an external face and a frustoconical opening through it coaxial with said enclosure through which the light beam enters the enclosure;

a back wall disposed longitudinally at the other end of said enclosure; and a conical body attached to said back wall and coaxial with said enclosure, the point of the cone facing the frustoconical opening.

Said frustoconical opening narrows in the direction from the internal face of the input member to the external face.

The entry part includes an inclined surface on the external face around said frustoconical opening adapted to reflect luminous radiation encountering said surface towards an absorbent peripheral surface facing the latter.

These auxiliary light elimination means are designed for light beams of which at least part may not enter said enclosure, that is to say:

either light beams that are not centered on the frustoconical opening, or light beams having a diameter greater than the diameter of said frustoconical opening.

Said prior art light trap has the drawback of not completely eliminating the processed unwanted light because:

firstly, the radiation that is processed by said auxiliary light elimination means is not totally annihilated, and secondly, the radiation that is processed in the enclosure may be partly reflected out of it, in particular because of the arrangement of the frustoconical opening.

An aim of the present invention is to remedy these drawbacks. It concerns a light trap of the type described previously that is shaped to offer a significantly increased efficiency.

SUMMARY OF THE INVENTION

To this end, in accordance with the invention, a light trap for a parallel light beam includes an enclosure in the form of a body of revolution comprising:

a lateral wall with an absorbent internal surface;

an entry member disposed longitudinally at one end of said enclosure, having an internal face, an external face and a frustoconical opening through it coaxial with said enclosure through which the light beam enters the enclosure;

a back wall disposed longitudinally at the other end of said enclosure; and a conical body attached to said back wall and coaxial with said enclosure, the point of the cone facing the frustoconical opening, wherein:

said frustoconical opening narrows in the direction from the external face of the entry member towards the internal face to concentrate the light and has on said external face a diameter equal to the diameter D of said light beam;

said entry member has a thickness E in the longitudinal direction of said enclosure defined by the equation:

$$E = D/(\tan 2A + \tan A),$$

where tan A is the tangent of A and A is the cone angle of said frustoconical opening; and said conical body is made from a material reflecting light uniformly in all directions.

The invention totally eliminates the light beam processed because:

the diameter of the frustoconical opening is matched to the light beam so that all of the latter enters the enclosure;

the thickness of the entry member is chosen to optimize the concentration of the light beam inside the enclosure;

the frustoconical opening, which narrows in the direction towards the internal face of the entry member where it has a significantly smaller diameter, prevents all exit of light from the enclosure; and the reflection of the light in all directions by the conical body attenuates the amplitude of the light, which facilitates its absorption by the internal wall of the enclosure (possibly after several successive reflections at said internal wall and said conical body) and thus its elimination.

For a light beam made up of visible light, said conical body is advantageously coated with barium sulfate and for a light beam made up of infrared radiation said conical body is advantageously coated with gold.

The lateral wall is advantageously adapted -to dissipate heat. To this end it is preferably made from copper, optionally coated with absorbent material appropriate to the incident radiation.

The figures of the appended drawing show clearly how the invention may be put into effect. The same reference symbols designate like members in both figures.

DETAILED DESCRIPTION OF THE PREFERRED EMBODIMENT

Figure 1:
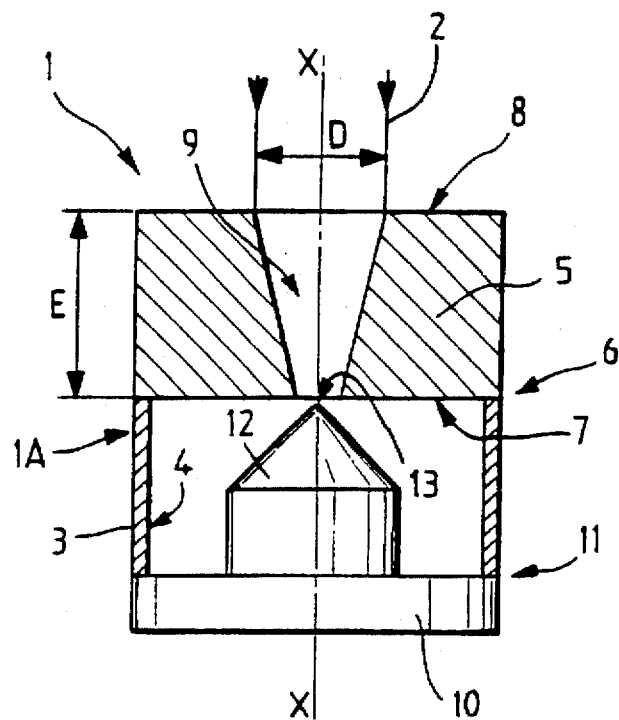
FIG. 1 is a diagram showing a light trap of the invention.

The light trap 1 of the invention shown diagrammatically in FIG. 1 is designed to eliminate a parallel light beam 2 having a circular cross-section of diameter D.

In a manner that is known in itself, said light trap 1 includes an enclosure 1A that is in the form of a body of revolution about an axis X—X and comprises:

a lateral wall 3 with an absorbent internal surface 4;

an entry member 5 disposed longitudinally at one end 6 of said enclosure 1A, having an internal face 7, an external face 8 and a frustoconical opening 9 through it coaxial with said enclosure 1A through which the light beam 2 enters the enclosure 1A;

a back wall 10 disposed longitudinally at the other end 11 of said enclosure 1A; and a conical body 12 attached to said back wall 10 and coaxial with said enclosure 1A, the point 13 of the cone facing said frustoconical opening 9.

In accordance with the invention, to obtain complete elimination of said parallel light beam 2, said light trap 1 has the following features:

the frustoconical opening 9 has on the external face 8 of the entry member 5 a diameter equal to the diameter D of the light beam 2 to be eliminated. Accordingly, by centering the trap 1 on the light beam 2, all of said light beam 2 enters the enclosure 1A. There is no reflection of said beam 2 from the external face 8 of the entry member 5;

the frustoconical opening 9 narrows from said external face 8 towards the internal face 7 of the entry member 5, having at said internal face 7 a small diameter d (see FIG. 2), which prevents any escape of radiation from the enclosure 1A after internal reflection;

the entry member 5 has a thickness E in the longitudinal direction of the enclosure 1A defined, in conjunction with the frustoconical opening 9, to optimize the concentration of the light beam 2 within the enclosure 1A, as explained below with reference to FIG. 2; and the conical body 12 is made from a material reflecting light uniformly in all directions rather than in a specular manner. To this end barium sulfate is preferably used when the light beam is made up of visible light and gold when it is made up of infrared or near-infrared light.

In this way the radiation entering the enclosure 1A is reflected in all directions by the conical body 12 so that its amplitude is strongly attenuated. Accordingly, it is more easily absorbed by the internal surface 4 of the wall 3, facing said conical body 12. Depending on the intensity of the radiation concerned, a plurality of successive reflections at said internal surface 4 and said conical body 12 may of course be necessary to eliminate said radiation completely.

The lateral wall 3 is additionally adapted to dissipate the heat generated by the absorption of the light. To this effect said lateral wall 3 is preferably made of copper with a coating of absorbent material appropriate to the incident radiation.

Accordingly, by virtue of the features mentioned above, the light trap 1 of the invention eliminates the processed light beam 2 completely.

As previously indicated, the thickness E of the entry member 5 and the dimensions of the frustoconical opening 9 are chosen conjointly to achieve optimal concentration of the light inside the enclosure 1A.

Figure 2:
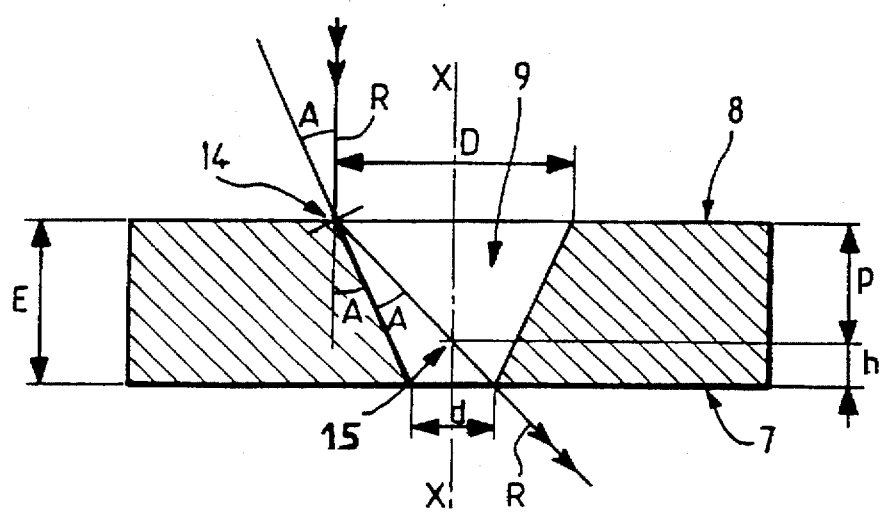
FIG. 2 is a diagram showing the entry member of a light trap of the invention.

To be more precise, these dimensions are chosen so that radiation R reflected at the external end 14 of the opening 9 enters the enclosure 1A without further reflection, as shown in FIG. 2. Said radiation R intersects the axis X—X at a point 15.

Letting:

A be the cone angle of the frustoconical opening 9, h be the longitudinal distance (along the axis X—X) between the internal face 7 and the point 15, and p be the longitudinal distance between the external face 8 and the point 15, i.e. E=h+p, the following equations are readily deduced from FIG. 2:

tan 2A=D/(2p), tan 2A being the tangent of the angle 2A, from which equation (1) can be obtained:

$$p = D/(2 \tan 2A) \qquad (1)$$

tan 2A=d/(2h), from which equation (2) can be obtained:

$$h = d/(2 \tan 2A) \qquad (2)$$

Equation (3) can be deduced from equations (1) and (2):

$$(D+d) = 2E \tan 2A \qquad (3)$$

Additionally, tan A=(D−d)/(2E), so that:

$$(D-d) = 2E \tan A \qquad (4)$$

Finally, equation (5) is deduced from equations (3) and (4):

$$E = D/(\tan 2A + \tan A) \qquad (5)$$

Equation (5) therefore gives the optimal thickness E of the entry member 5 as a function of the diameter D and a particular cone angle A.

There is claimed:

1. A light trap for a parallel light beam, including an enclosure in the form of a body of revolution comprising:

a lateral wall with an absorbent internal surface;

an entry member disposed longitudinally at one end of said enclosure, having an internal face, an external face and a frustoconical opening through it coaxial with said enclosure through which the light beam enters said enclosure;

a back wall disposed longitudinally at the other end of said enclosure; and a conical body attached to said back wall and coaxial with said enclosure, the point of the cone facing said frustoconical opening, wherein:

said frustoconical opening narrows in the direction from the external face of said entry member towards the internal face to concentrate the light and has on said external face a diameter equal to the diameter D of said light beam;

said entry member has a thickness E in the longitudinal direction of said enclosure defined by the equation:

$$E = D/(\tan 2A + \tan A),$$

where tan A is the tangent of A and A is the cone angle of said frustoconical opening; and said conical body is made from a material reflecting light uniformly in all directions.

2. A light trap as claimed in claim 1 for a light beam made up of visible light wherein said conical body is coated with barium sulfate.

3. A light trap as claimed in claim 1 for a light beam made up of infrared radiation wherein said conical body is covered with gold.

4. A light trap according to claim 1 wherein said lateral wall is adapted to dissipate heat.

5. A light trap as claimed in claim 4 wherein said lateral wall is made of copper.

6. A light trap as claimed in claim 5 wherein said copper lateral wall is coated with an absorbent material appropriate to the incident radiation.

* * * * *